(12) United States Patent
Xie et al.

(10) Patent No.: US 11,392,461 B2
(45) Date of Patent: Jul. 19, 2022

(54) METHOD AND APPARATUS FOR PROCESSING INFORMATION

(71) Applicant: BEIJING BAIDU NETCOM SCIENCE AND TECHNOLOGY CO., LTD., Beijing (CN)

(72) Inventors: Yongji Xie, Beijing (CN); Wen Chai, Beijing (CN); Yu Zhang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 57 days.

(21) Appl. No.: 16/568,025

(22) Filed: Sep. 11, 2019

(65) Prior Publication Data
US 2020/0183795 A1 Jun. 11, 2020

(30) Foreign Application Priority Data

Dec. 7, 2018 (CN) .......................... 201811497981.X (51) Int. Cl.
*G06F 11/14* (2006.01)
*G06F 9/455* (2018.01)
*G06F 12/1009* (2016.01)

(52) U.S. Cl.
CPC ...... *G06F 11/1469* (2013.01); *G06F 9/45558* (2013.01); *G06F 11/1482* (2013.01); *G06F 12/1009* (2013.01); *G06F 2009/45575* (2013.01); *G06F 2009/45583* (2013.01); *G06F 2201/815* (2013.01); *G06F 2201/84* (2013.01); *G06F 2212/7201* (2013.01)

(58) Field of Classification Search
CPC ....... G06F 9/45558; G06F 2009/45591; G06F 2201/815; G06F 2009/45575; G06F 2009/45583; G06F 2201/84; G06F 11/1441; G06F 11/1469; G06F 11/1482; G06F 11/1484; G06F 2212/7201; G06F 12/1009; G06F 12/109; G06F 2212/1032; G06F 2212/151; G06F 2212/657; G06F 11/203
USPC .......................................................... 711/162
See application file for complete search history.

(56) References Cited

U.S. PATENT DOCUMENTS

| | | | |
|---|---|---|---|
| 7,505,960 B2 * | 3/2009 | Travison | G06F 16/2255 |
| 10,846,117 B1 * | 11/2020 | Steinberg | G06F 9/544 |
| 2007/0006226 A1 * | 1/2007 | Hendel | G06F 11/3636 718/1 |

(Continued)

FOREIGN PATENT DOCUMENTS

CN 102929747 A 2/2013

*Primary Examiner* — Hashem Farrokh
(74) *Attorney, Agent, or Firm* — Nixon Peabody LLP (57) ABSTRACT

Embodiments of the present disclosure relate to a method and apparatus for processing information. The method can include: acquiring virtual machine device status information and physical address information from a target memory in response to determining a crash of a production kernel, the target memory being a memory pre-allocated to a running virtual machine by the production kernel, and the virtual machine device status information of the virtual machine and the physical address information corresponding to a virtual address of the memory of the virtual machine being stored into the target memory by the production kernel; acquiring data as target data according to the physical address information; and storing a file into a shared storage area according to the target data and the virtual machine device status information.

16 Claims, 5 Drawing Sheets

(56) References Cited

U.S. PATENT DOCUMENTS

| | | | |
|---|---|---|---|
| 2011/0246986 A1* | 10/2011 | Nicholas | G06F 9/45545 |
| | | | 718/1 |
| 2016/0364341 A1 | 12/2016 | Banginwar et al. | |
| 2017/0300394 A1* | 10/2017 | Raut | G06F 11/2048 |
| 2018/0074956 A1* | 3/2018 | Chen | G06F 9/45558 |
| 2018/0276081 A1 | 9/2018 | Zhang | |
| 2019/0056985 A1* | 2/2019 | Farkas | H04L 41/0654 |
| 2019/0138349 A1 | 5/2019 | Xie | |

* cited by examiner

METHOD AND APPARATUS FOR PROCESSING INFORMATION

CROSS-REFERENCE TO RELATED APPLICATIONS

This application claims priority to Chinese Patent Application No. 201811497981.X, filed with the China National Intellectual Property Administration (CNIPA) on Dec. 7, 2018, the contents of which are incorporated herein by reference in its entirety.

TECHNICAL FIELD

Embodiments of the present disclosure relate to the field of computer technology, and specifically to a method and apparatus for processing information.

BACKGROUND

With the development of computer technology, services provided using the computer technology and the Internet technology are becoming more and more abundant. A logical computer (i.e., a virtual machine) may be virtualized on a physical machine (an electronic device) using the virtualization technology, for providing a service to external. There are many factors affecting the stability of the virtual machine. Here, the crash of the host machine where the virtual machine is located is undoubtedly the most uncontrollable and most harmful factor. The crash of the host machine will cause the virtual machine running on the host machine to be down, which affects the virtual machine providing a service, and even may cause serious accidents such as damaging a storage medium of the virtual machine or a data loss.

SUMMARY

Embodiments of the present disclosure propose a method and apparatus for processing information.

In a first aspect, some embodiments of the present disclosure provide a method for processing information. The method includes: acquiring virtual machine device status information and physical address information from a target memory in response to determining a crash of a production kernel, the target memory being a memory pre-allocated to a running virtual machine by the production kernel, and the virtual machine device status information of the virtual machine and the physical address information corresponding to a virtual address of the memory of the virtual machine being stored into the target memory by the production kernel; acquiring data as target data based on the physical address information; and storing a file into a shared storage area according to the target data and the virtual machine device status information.

In some embodiments, the method further includes: sending a virtual machine recovery request to a backup electronic device, the virtual machine recovery request including a file identifier of the file, for the backup electronic device to acquire the file from the shared storage area according to the file identifier and recover the virtual machine according to the file.

In some embodiments, the storing a file into a shared storage area according to the target data and the virtual machine device status information includes: generating a snapshot file according to the target data and the virtual machine device status information; and storing the snapshot file into the shared storage area.

In some embodiments, the physical address information is generated by the production kernel by: sending a stopping running instruction to the virtual machine, the stopping running instruction being used to control the virtual machine to stop running; and generating the physical address information according to a pre-stored page table and the virtual address of the memory of the virtual machine, the page table being used to describe a corresponding relationship between the virtual address and a physical address.

In some embodiments, the acquiring virtual machine device status information and physical address information from a target memory includes: acquiring the virtual machine device status information and the physical address information from the target memory through a virtual file system.

In a second aspect, some embodiments of the present disclosure provide an apparatus for processing information. The apparatus includes: a first acquiring unit, configured to acquire virtual machine device status information and physical address information from a target memory in response to determining a crash of a production kernel, the target memory being a memory pre-allocated to a running virtual machine by the production kernel, and the virtual machine device status information of the virtual machine and the physical address information corresponding to a virtual address of the memory of the virtual machine being stored into the target memory by the production kernel; a second acquiring unit, configured to acquire data as target data based on the physical address information; and a storing unit, configured to store a file into a shared storage area according to the target data and the virtual machine device status information.

In some embodiments, the apparatus further includes: a sending unit, configured to send a virtual machine recovery request to a backup electronic device, the virtual machine recovery request including a file identifier of the file, for the backup electronic device to acquire the file from the shared storage area according to the file identifier and recover the virtual machine according to the file.

In some embodiments, the storing unit is further configured to: generate a snapshot file according to the target data and the virtual machine device status information; and store the snapshot file into the shared storage area.

In some embodiments, the physical address information is generated by the production kernel by: sending a stopping running instruction to the virtual machine, the stopping running instruction being used to control the virtual machine to stop running; and generating the physical address information according to a pre-stored page table and the virtual address of the memory of the virtual machine, the page table being used to describe a corresponding relationship between the virtual address and a physical address.

In some embodiments, the first acquiring unit is further configured to: acquire the virtual machine device status information and the physical address information from the target memory through a virtual file system.

In a third aspect, some embodiments of the present disclosure provide a server. The server includes: one or more processors; and a storage device, configured to store one or more programs. The one or more programs, when executed by the one or more processors, cause the one or more processors to implement the method described in any implementation in the first aspect.

In a fourth aspect, some embodiments of the present disclosure provide a computer readable medium storing a computer program. The computer program, when executed by a processor, implements the method described in any implementation in the first aspect.

According to the method and apparatus for processing information provided by some embodiments of the present disclosure, the virtual machine device status information and the physical address information are acquired from the target memory in response to determining the crash of the production kernel. Then, the data is acquired as the target data according to the physical address information. Finally, the file is stored into the shared storage area according to the target data and the virtual machine device status information. Thus, it is implemented that the related file of the virtual machine run by the production kernel is saved into the shared storage area at the time of the crash of the production kernel, which avoids the data loss of the virtual machine caused by the crash of the production kernel.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

Embodiments of the present disclosure will be further described below in detail in combination with the accompanying drawings. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that some embodiments in the present disclosure and some features in the disclosure may be combined with each other on a non-conflict basis. Features of the present disclosure will be described below in detail with reference to the accompanying drawings and in combination with the embodiments.

Figure 1:
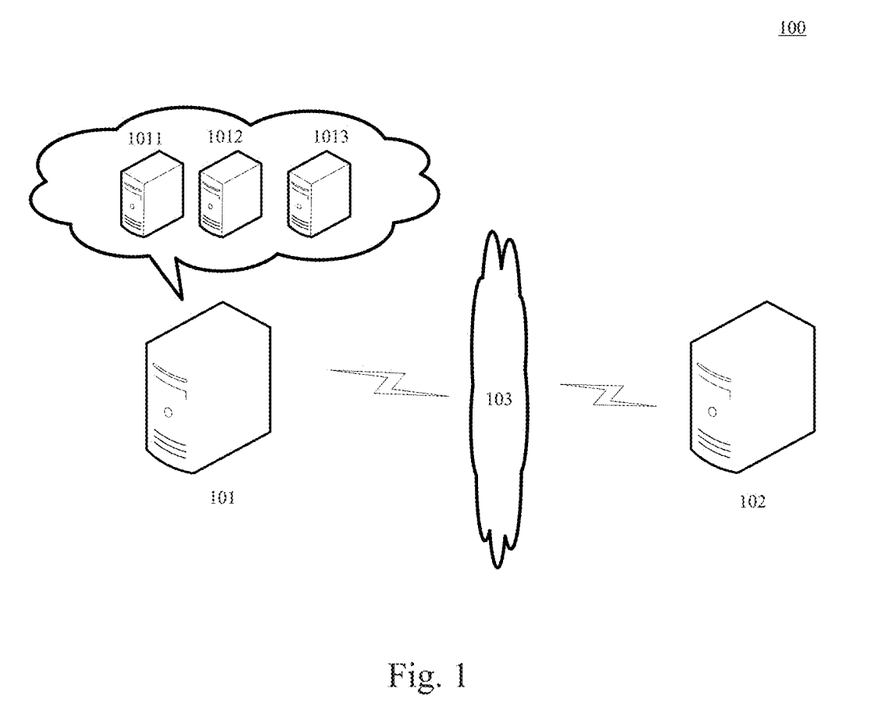
FIG. 1 is a diagram of an example system architecture in which an embodiment of the present disclosure may be applied.

FIG. 1 shows an example system architecture 100 in which a method for processing information or an apparatus for processing information according to some embodiments of the present disclosure may be applied.

As shown in FIG. 1, the system architecture 100 may include a host machine 101, a server 102 and a network 103. The network 103 serves as a medium providing a communication link between the host machine 101 and the server 102. The network 103 may include various types of connections, for example, wired or wireless communication links, or optical fiber cables.

The host machine 101 may be a physical machine on which a virtual machine providing cloud computing runs. Virtual machines 1011, 1012 and 1013 may run on the host machine 101. The virtual machines 1011, 1012 and 1013 may access a hardware device of the host machine 101. For example, the virtual machines 1011, 1012 and 1013 may access the hardware device on the host machine 101 through device drivers installed on the virtual machines 1011, 1012 and 1013. In general, the behavior of that the device drivers of the virtual machines 1011, 1012 and 1013 access the hardware device of the host machine 101 may be recorded by a virtual machine monitor (VMM) on the host machine 101. In an actual application scenario, the host machine 101 may be a server providing various kinds of cloud services, and the virtual machine monitor may run on the server, for managing and recording the statuses and the operations of the virtual machines running on the server.

The server 102 may be a file sharing storage server for storing data. For example, the server 102 may store a file sent by the host machine 101.

It should be appreciated that the numbers of the host machines, the virtual machines, the networks, and the servers in FIG. 1 are merely illustrative. Any number of host machines, virtual machines, networks and servers may be provided based on actual requirements.

It should be noted that the method for processing information provided by some embodiments of the present disclosure is generally performed by the host machine 101. Correspondingly, the apparatus for processing information is generally provided in the host machine 101.

Figure 2:
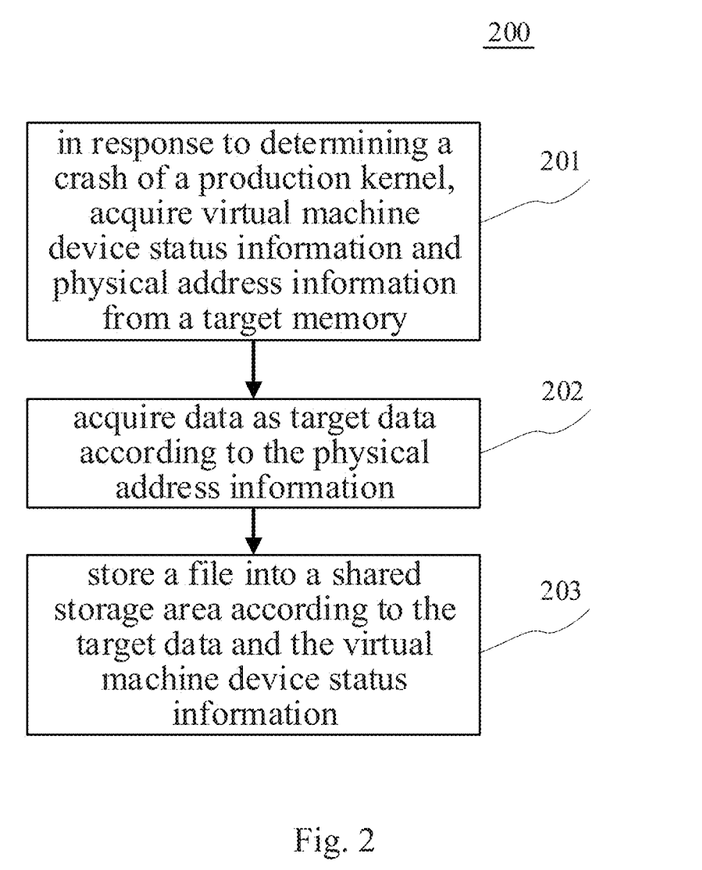
FIG. 2 is a flowchart of a method for processing information according to an embodiment of the present disclosure.

Further referring to FIG. 2, FIG. 2 illustrates a flow 200 of a method for processing information according to an embodiment of the present disclosure. The method for processing information includes the following steps:

Step 201, in response to determining a crash of a production kernel, acquiring virtual machine device status information and physical address information from a target memory.

In this embodiment, the production kernel (or first kernel) may run on the executing body (e.g., the host machine 101 shown in FIG. 1) of the method for processing information, and a virtual machine and a virtual machine monitor may run in the production kernel. The virtual machine may refer to a complete computer system simulated by a software, the virtual machine has a complete hardware system functionality and runs in a completely isolated environment. Here, the production kernel may be a computer program managing and controlling hardware and software resources of a computer, or may be most basic system software running directly on a bare machine. Other software needs to run with the support of the production kernel. Here, the production kernel may be any type of system software, for example, a Linux system.

In practice, during the running of the production kernel, an abnormal event may occur, for example, a kernel deadlock event, a kernel null pointer access event, and an event of an illegal operation detected in a kernel module. It is also possible that the key indicator of the running of the host machine is abnormal, for example, an excessive load. For some predefined abnormal events, once one of the events occurs, it represents that an irreversible error may occur in the production kernel itself, that is, the production kernel crashed. At this point, the production kernel may perform a downtime operation by calling a target kernel module, and then attempt to recover by rebooting. As an example, the target kernel module may be a module packaging a panic function.

In practice, there are a plurality of ways to deal with a kernel crash. For example, there are a plurality of crash dump mechanisms for the kernel of a Linux operating system, so as to save the memory content for post-mortem analysis when the system kernel crashes. For example, kdump is a mechanism provided by the Linux system for dumping runtime memory when a physical machine is down. By reserving some memory in the system, kdump allows the kernel to boot a second kernel to dump the runtime memory when the kernel is down. Kdump is a tool and a service used to dump a memory running parameter when the system crashes, is deadlocked or goes down. For example, once the system crashes, the normal kernel cannot work; at this point, kdump generates a kernel for capturing current running information; the kernel collects all the running statuses and all the data information in the memory at this time into a dump core file, so as to subsequently analyze the cause of the crash; once the memory information is collected, the system automatically reboots.

In this embodiment, in response to determining the crash of the production kernel, the executing body may acquire the virtual machine device status information and the physical address information from the target memory. Here, the target memory may be a memory pre-allocated to a running virtual machine by the production kernel. The virtual machine device status information of the virtual machine and the physical address information corresponding to the virtual address of the memory of the virtual machine are stored into the target memory by the production kernel. As an example, the virtual machine monitor running in the executing body may store the virtual machine device status information of each virtual machine and the corresponding physical address information into the target memory pre-allocated for this virtual machine. Here, the virtual machine device status information may refer to status information of a virtual device of the virtual machine. As an example, the virtual device includes a virtual network card, a virtual disk, a virtual CPU (central processing unit), or the like.

In some alternative implementations of this embodiment, the physical address information may be generated by the production kernel through the following steps: first, a stopping running instruction is sent to the virtual machine, the stopping running instruction being used to control the virtual machine to stop running; then, the physical address information is generated according to a pre-stored page table and the virtual address of the memory of the virtual machine, the page table being used to describe a corresponding relationship between the virtual address and a physical address.

In this embodiment, in response to determining the crash of the production kernel, the production kernel may send the running stopping instruction to the virtual machine running thereon, to control the virtual machine to stop running. Then, the physical address information may be generated according to the pre-stored page table and the virtual address of the memory of the virtual machine. As an example, the virtual address of the memory of the virtual machine may be a contiguous address, which may include a start address and a length. In this way, the executing body may convert the contiguous virtual address of the memory of the virtual machine into a discrete physical address according to the corresponding relationship between the virtual address and the physical address that is recorded in the page table, to obtain the physical address information in the form of a linked list.

Step 202, acquiring data as target data according to the physical address information.

In this embodiment, the executing body may acquire the data as the target data according to the physical address information acquired in step 201. In practice, the physical address information may be a linked list. The linked list is a non-contiguous and non-sequential storage structure on a physical storage unit, the logical order of data elements is implemented by the linking order of pointers in the linked list. The linked list consists of a series of nodes (each element in the list is referred to as a node), and each node includes two parts: one is a data field storing a data element, and the other is a pointer field storing the address of a next node. In this way, the executing body may sequentially access the nodes in the linked list to acquire the data of the nodes, and use the acquired data as the target data.

In some alternative implementations of this embodiment, step 202 may be specifically performed as follows: acquiring the virtual machine device status information and the physical address information from the target memory through a virtual file system.

In this implementation, the executing body may acquire the virtual machine device status information and the physical address information from the target memory through the virtual file system. As an example, the memory of the executing body may be divided into a kernel space (kernel mode) and a user space (user mode). The kernel space may be used to execute an operating system instruction, and the user space may be used to execute a user program instruction. As an example, the production kernel may run in the kernel space, and the steps of the method for processing information of the present disclosure may be performed in the user space. In practice, some information of the kernel space may be presented to the user space through the virtual file system. For example, a data interface may be provided for the user space through the virtual file system (e.g., /proc file system), thus, through the data interface, a user program executed in the user space may acquire the virtual machine device status information and the physical address information in the production kernel in the kernel space.

Step 203, storing a file into a shared storage area according to the target data and the virtual machine device status information.

In this embodiment, the executing body may store the file into the shared storage area according to the target data and the virtual machine device status information. Here, the shared storage area may be a preset storage area in an electronic device (e.g., the server 102 shown in FIG. 1) for storing data. As an example, the executing body may directly store the target data and the virtual machine device status information, as the file, into the shared storage area.

In some alternative implementations of this embodiment, step 203 may be specifically performed as follows: first, a snapshot file is generated according to the target data and the virtual machine device status information; then, the snapshot file is stored into the shared storage area.

In this implementation, the executing body may generate the snapshot file according to the target data and the virtual machine device status information for the first time. Here, a snapshot is a fully available copy of a specified data set, the copy containing a static image of the source data at the copy point-in-time. The snapshot may be a copy or a replication of data reproduction. It should be noted that the snapshot technology is a well-known technology widely studied and applied at present, which will not be repeatedly described here. Then, the executing body may store the generated snapshot file into the shared storage area. In this implementation, the target data corresponding to the virtual machine run by the production kernel and the virtual machine device status information at the moment of the crash of the production kernel may be saved through the snapshot technology, and stored into the shared storage area, which avoids the data loss of the virtual machine caused by the crash of the production kernel.

Figure 3:
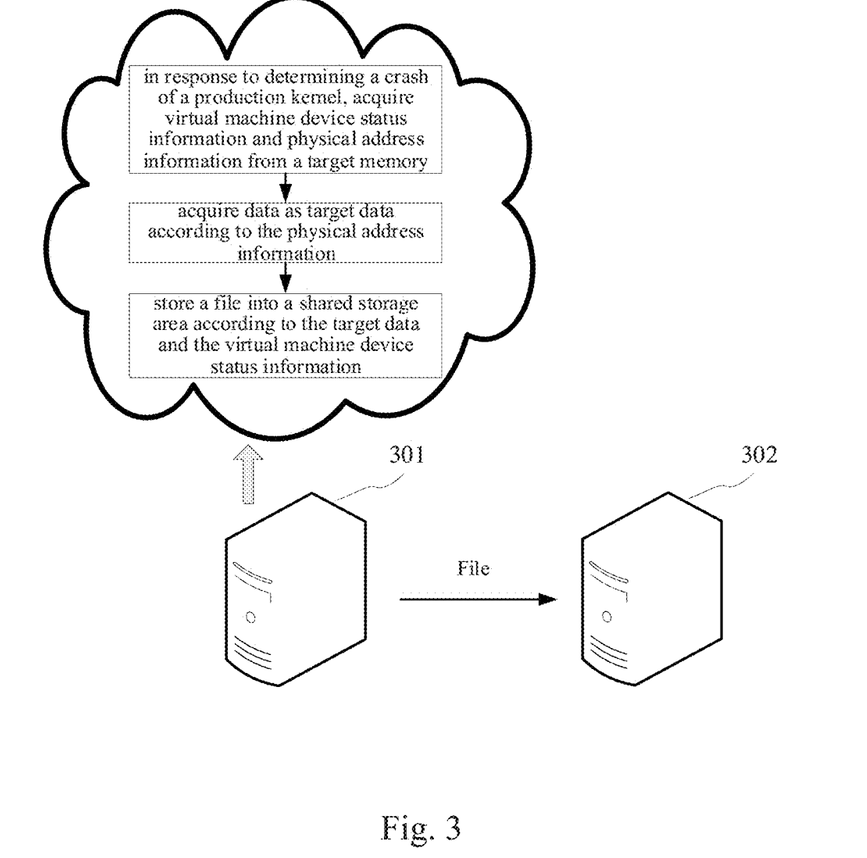
FIG. 3 is a schematic diagram of an application scenario of the method for processing information according to an embodiment of the present disclosure.

Further referring to FIG. 3, FIG. 3 is a schematic diagram of an application scenario of the method for processing information according to this embodiment. In the application scenario of FIG. 3, in response to determining the crash of the production kernel, the host machine 301 may acquire the virtual machine device status information and physical address information from the target memory. The target memory is the memory pre-allocated to the running virtual machine by the production kernel, and the virtual machine device status information of the virtual machine and the physical address information corresponding to the virtual address of the memory of the virtual machine are stored into the target memory by the production kernel. Then, the host machine 301 may acquire data as the target data according to the physical address information. Finally, the host machine 301 may store a file into the shared storage area of the server 302 according to the target data and the virtual machine device status information.

According to the method provided by the above embodiment of the present disclosure as well as by at least some of the other disclosed embodiments, a related file of the virtual machine run by the production kernel is saved into the shared storage area at the time of the crash of the production kernel, which avoids the data loss of the virtual machine caused by the crash of the production kernel.

Figure 4:
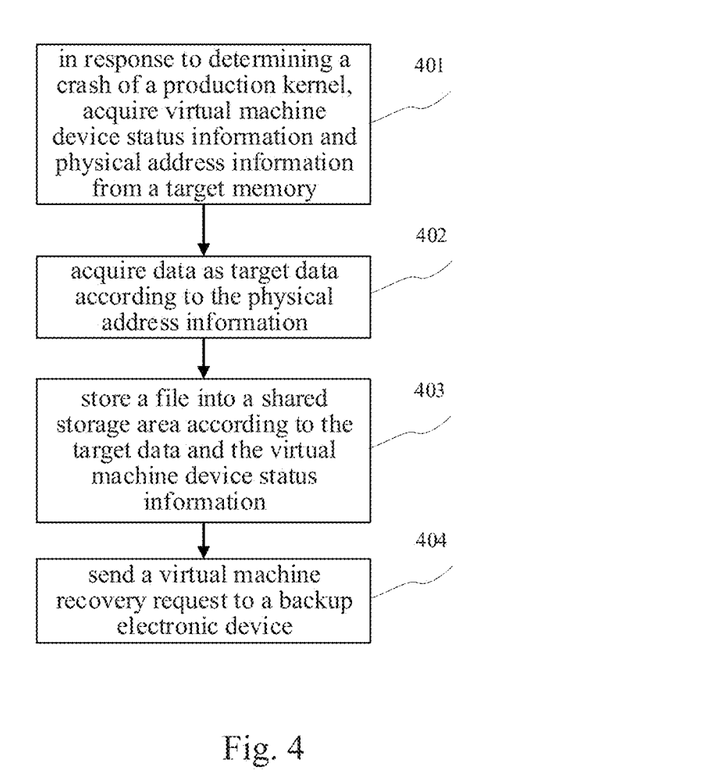
FIG. 4 is a flowchart of the method for processing information according to another embodiment of the present disclosure.

Further referring to FIG. 4, FIG. 4 illustrates a flow 400 of another embodiment of the method for processing information. The flow 400 of the method for processing information includes the following steps:

Step 401, in response to determining a crash of a production kernel, acquiring virtual machine device status information and physical address information from a target memory.

In this embodiment, step 401 is similar to step 201 of the embodiment shown in FIG. 2, which will not be repeatedly described here.

Step 402, acquiring data as target data according to the physical address information.

In this embodiment, step 402 is similar to step 202 of the embodiment shown in FIG. 2, which will not be repeatedly described here.

Step 403, storing a file into a shared storage area according to the target data and the virtual machine device status information.

In this embodiment, step 403 is similar to step 203 of the embodiment shown in FIG. 2, which will not be repeatedly described here.

Step 404, sending a virtual machine recovery request to a backup electronic device.

In this embodiment, the executing body may send the virtual machine recovery request to a preset backup electronic device. The virtual machine recovery request may include the file identifier of the file. In this way, the backup electronic device may acquire the file from the shared storage area according to the file identifier, and the virtual machine run by the production kernel at the time of the crash of the production kernel is locally recovered in the backup electronic device according to the file. It should be noted that recovering the virtual machine in the backup electronic device according to the related file of the virtual machine is a well-known technology widely studied and applied at present, which will not be repeatedly described here.

It may be seen from FIG. 4 that, as compared with the embodiment corresponding to FIG. 2, the flow 400 of the method for processing information in this embodiment emphasizes the step of sending the virtual machine recovery request to a backup electronic device. Accordingly, the scheme described in this embodiment may recover the virtual machine run by the production kernel using the backup electronic device at the time of the crash of the production kernel. Thus, the virtual machine continues to run on the backup electronic device is realized, and the high availability of the virtual machine is ensured.

Figure 5:
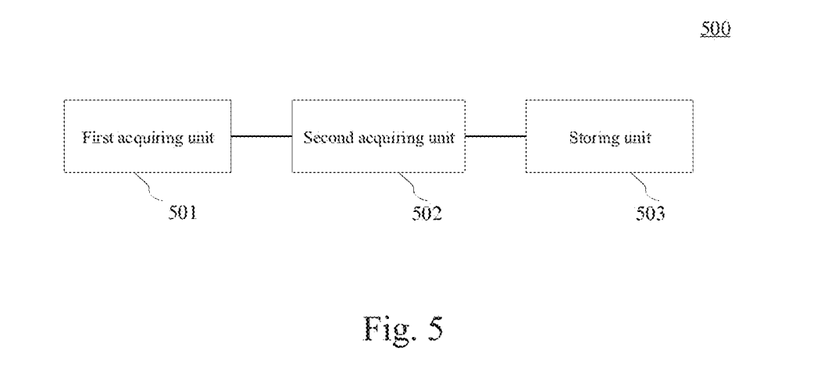
FIG. 5 is a schematic structural diagram of an apparatus for processing information according to an embodiment of the present disclosure.

Further referring to FIG. 5, as an implementation of the method shown in the above drawings, the present disclosure provides an embodiment of an apparatus for processing information. The embodiment of the apparatus corresponds to the embodiment of the method shown in FIG. 2, and the apparatus may be applied in various electronic devices.

As shown in FIG. 5, the apparatus 500 for processing information in this embodiment includes: a first acquiring unit 501, a second acquiring unit 502 and a storing unit 503. The first acquiring unit 501 is configured to acquire virtual machine device status information and physical address information from a target memory in response to determining a crash of a production kernel, the target memory being a memory pre-allocated to a running virtual machine by the production kernel, and the virtual machine device status information of the virtual machine and the physical address information corresponding to a virtual address of the memory of the virtual machine being stored into the target memory by the production kernel. The second acquiring unit 502 is configured to acquire data as target data based on the physical address information. The storing unit 503 is configured to store a file into a shared storage area according to the target data and the virtual machine device status information.

In this embodiment, for specific processes of the first acquiring unit 501, the second acquiring unit 502 and the storing unit 503 in the apparatus 500 for processing information, and their technical effects, reference may be made to relative descriptions of step 201, step 202 and step 203 in the corresponding embodiment of FIG. 2 respectively, which will not be repeatedly described here.

In some alternative implementations of this embodiment, the apparatus 500 may further include: a sending unit (not shown), configured to send a virtual machine recovery request to a backup electronic device. The virtual machine recovery request includes a file identifier of the file, for the backup electronic device to acquire the file from the shared storage area according to the file identifier and recover the virtual machine according to the file.

In some alternative implementations of this embodiment, the storing unit 503 may further be configured to: generate a snapshot file according to the target data and the virtual machine device status information; and store the snapshot file into the shared storage area.

In some alternative implementations of this embodiment, the physical address information may be generated by the production kernel by: sending a stopping running instruction to the virtual machine, the stopping running instruction being used to control the virtual machine to stop running; and generating the physical address information according to a pre-stored page table and the virtual address of the memory of the virtual machine, the page table being used to describe a corresponding relationship between the virtual address and a physical address.

In some alternative implementations of this embodiment, the first acquiring unit 501 may further be configured to: acquire the virtual machine device status information and the physical address information from the target memory through a virtual file system.

Figure 6:
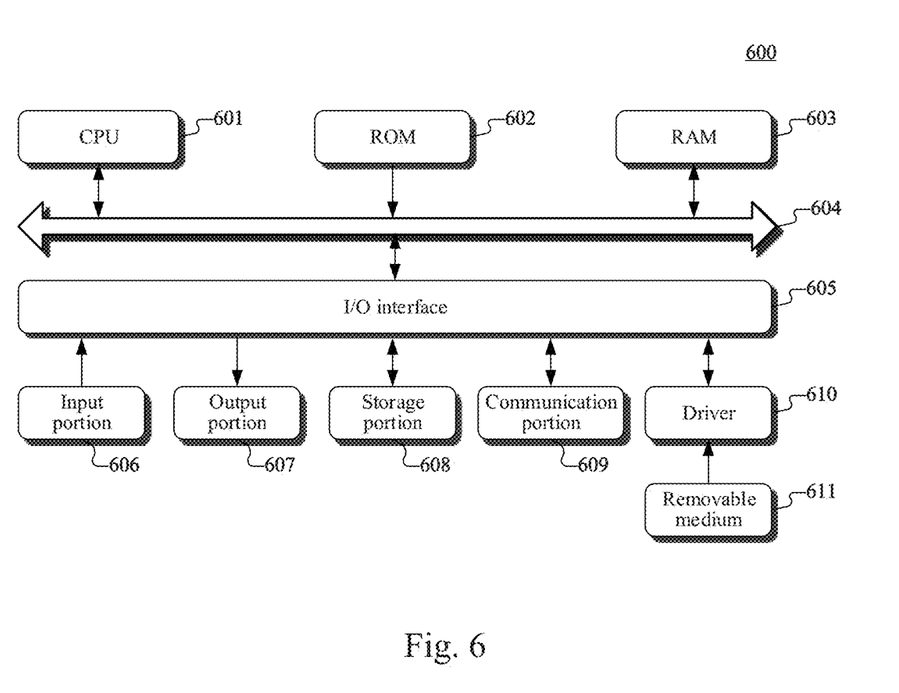
FIG. 6 is a schematic structural diagram of a computer system adapted to implement a server according to some embodiments of the present disclosure.

Referring to FIG. 6, FIG. 6 is a schematic structural diagram of a computer system 600 adapted to implement a server of some embodiments of the present disclosure. The server shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including a cathode ray tube (CRT), a liquid crystal display device (LCD), a speaker, etc.; a storage portion 608 including a hard disk and the like; and a communication portion 609 including a network interface card such as a LAN (local area network) card and a modem. The communication portion 609 performs communication processes via a network such as the Internet. A driver 610 is also connected to the I/O interface 605 as required. A removable medium 611 such as a magnetic disk, an optical disk, a magneto-optical disk, and a semiconductor memory may be installed on the driver 610, to facilitate the retrieval of a computer program from the removable medium 611, and the installation thereof on the storage portion 608 as needed.

In particular, according to some embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 609, and/or may be installed from the removable medium 611. The computer program, when executed by the central processing unit (CPU) 601, implements the above mentioned functionalities defined in the method of the present disclosure.

It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as apart of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, the command execution system, apparatus or element. The program codes contained on the computer readable medium may be transmitted with any suitable medium including, but not limited to, wireless, wired, optical cable, RF medium, or any suitable combination of the above.

A computer program code for executing the operations according to some embodiments of the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequence shown in the figures. For example, any two blocks presented in succession may be executed substantially in parallel, or they may sometimes be executed in a reverse sequence, depending on the function involved. It should also be noted that each block in the block diagrams and/or flowcharts as well as a combination of blocks in the block diagrams and/or flowcharts may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor. For example, the processor may be described as: a processor comprising a first acquiring unit, a second acquiring unit and a storing unit. The names of these units do not in some cases constitute a limitation to such units themselves. For example, the first acquiring unit may alternatively be described as "a unit for acquiring virtual machine device status information and physical address information from a target memory in response to determining a crash of a production kernel."

In another aspect, the present disclosure further provides a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: acquire virtual machine device status information and physical address information from a target memory in response to determining a crash of a production kernel, the target memory being a memory pre-allocated to a running virtual machine by the production kernel, and the virtual machine device status information of the virtual machine and the physical address information corresponding to a virtual address of the memory of the virtual machine being stored into the target memory by the production kernel; acquire data as target data based on the physical address information; and store a file into a shared storage area according to the target data and the virtual machine device status information.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, for example, technical solutions formed by replacing the features as disclosed in the present disclosure with (but not limited to) technical features with similar functions.

What is claimed is:

1. A method for processing information, wherein the method is performed in a user space of a host machine, a memory of the host machine being partitioned into a kernel space supporting a production kernel and the user space, wherein a virtual machine runs in the production kernel, the method comprising:
in response to a crash of the production kernel of the host machine, acquiring, via a virtual file system, virtual machine device status information and physical address information from a target memory in the kernel space, the target memory being a memory in the kernel space pre-allocated to the virtual machine by the production kernel for storing the virtual machine status information of the virtual machine and the physical address information corresponding to a virtual address of virtual machine memory into the target memory in the kernel space, wherein the physical address information is generated by the production kernel by: in response to the crash of the production kernel of the host machine, sending a stopping running instruction to the virtual machine, the stopping running instruction being used to control the virtual machine to stop running; and generating the physical address information according to a pre-stored page table and the virtual address of the memory of the virtual machine, the page table being used to describe a corresponding relationship between the virtual address and a physical address;
acquiring data as target data based on the physical address information; and
storing a file into a shared storage area according to the target data and the virtual machine device status information.

2. The method according to claim 1, further comprising:
sending a virtual machine recovery request to a backup electronic device, the virtual machine recovery request including a file identifier of the file, for the backup electronic device to acquire the file from the shared storage area according to the file identifier and recover the virtual machine according to the file.

3. The method according to claim 1, wherein the storing a file into a shared storage area according to the target data and the virtual machine device status information includes:
generating a snapshot file according to the target data and the virtual machine device status information; and
storing the snapshot file into the shared storage area.

4. The method according to claim 1, wherein the physical address information is a linked list, and the acquiring the data as the target data based on the physical address information comprises:
accessing nodes in the linked list sequentially, to acquire the data of the nodes as the target data.

5. The method according to claim 1, wherein the production kernel is a kernel of an operating system of the host machine, and the crash of the production kernel refers to a kernel deadlock event, a kernel null pointer access event, or an event of an illegal operation being detected.

6. An apparatus for processing information, comprising:
at least one processor; and
a memory storing instructions, the instructions when executed by the at least one processor, causing the at least one processor to perform operations, wherein the operations are performed in a user space of a host machine, a memory of the host machine being partitioned into a kernel space supporting a production kernel and the user space, wherein a virtual machine runs in the production kernel, the operations comprising:
acquiring, via a virtual file system, virtual machine device status information and physical address information from the target memory in the kernel space in response to a crash of the production kernel of the host machine, the target memory being a memory in the kernel space pre-allocated to the virtual machine by the production kernel for storing the virtual machine status information of the virtual machine and the physical address information corresponding to a virtual address of virtual machine memory into the target memory in the kernel space, wherein the physical address information is generated by the production kernel by: in response to the crash of the production kernel of the host machine, sending a stopping running instruction to the virtual machine, the stopping running instruction being used to control the virtual machine to stop running; and generating the physical address information according to a pre-stored page table and the virtual address of the memory of the virtual machine, the page table being used to describe a corresponding relationship between the virtual address and a physical address;
acquiring data as target data based on the physical address information; and
storing a file into a shared storage area according to the target data and the virtual machine device status information.

7. The apparatus according to claim 6, wherein the operations further comprise:
sending a virtual machine recovery request to a backup electronic device, the virtual machine recovery request including a file identifier of the file, for the backup electronic device to acquire the file from the shared storage area according to the file identifier and recover the virtual machine according to the file.

8. The apparatus according to claim 6, wherein the storing a file into a shared storage area according to the target data and the virtual machine device status information includes:
generating a snapshot file according to the target data and the virtual machine device status information; and
storing the snapshot file into the shared storage area.

9. The apparatus according to claim 6, wherein the physical address information is a linked list, and the acquiring the data as the target data based on the physical address information comprises:
accessing nodes in the linked list sequentially, to acquire the data of the nodes as the target data.

10. The apparatus according to claim 6, wherein the production kernel is a kernel of an operating system of the host machine, and the crash of the production kernel refers to a kernel deadlock event, a kernel null pointer access event, or an event of an illegal operation being detected.

11. A non-transitory computer readable medium, storing a computer program, wherein the program, when executed by a processor, causes the processor to perform operations, wherein the operations are performed in a user space of a host machine, a memory of the host machine being partitioned into a kernel space supporting a production kernel and the user space, wherein a virtual machine runs in the production kernel, the operations comprising:
in response to a crash of the production kernel of the host machine, acquiring, via a virtual file system, virtual machine device status information and physical address information from a target memory in the kernel space, the target memory being a memory in the kernel space pre-allocated to the virtual machine for storing the virtual machine status information of the virtual machine and the physical address information corresponding to a virtual address of virtual machine memory into the target memory in the kernel space, wherein the physical address information is generated by the production kernel by: in response to the crash of the production kernel of the host machine, sending a stopping running instruction to the virtual machine, the stopping running instruction being used to control the virtual machine to stop running; and generating the physical address information according to a pre-stored page table and the virtual address of the memory of the virtual machine, the page table being used to describe a corresponding relationship between the virtual address and a physical address;
acquiring data as target data based on the physical address information; and
storing a file into a shared storage area according to the target data and the virtual machine device status information.

12. The medium according to claim 11, wherein the operations further comprise:
sending a virtual machine recovery request to a backup electronic device, the virtual machine recovery request including a file identifier of the file, for the backup electronic device to acquire the file from the shared storage area according to the file identifier and recover the virtual machine according to the file.

13. The medium according to claim 11, wherein the storing a file into a shared storage area according to the target data and the virtual machine device status information includes:
generating a snapshot file according to the target data and the virtual machine device status information; and
storing the snapshot file into the shared storage area.

14. The medium according to claim 11, wherein the physical address information is a linked list, and the acquiring the data as the target data based on the physical address information comprises:
accessing nodes in the linked list sequentially, to acquire the data of the nodes as the target data.

15. The medium according to claim 11, wherein the production kernel is a kernel of an operating system of the host machine, and the crash of the production kernel refers to a kernel deadlock event, a kernel null pointer access event, or an event of an illegal operation being detected.

16. The method according to claim 1, wherein the production kernel is a kernel of a Linux operating system.

* * * * *